United States Patent [19]

Kosugi

[11] 4,004,469
[45] Jan. 25, 1977

[54] PISTON-CRANK MECHANISM FOR INTERNAL COMBUSTION ENGINES

[75] Inventor: Soichiro Kosugi, Iwata, Japan

[73] Assignee: Yamaha, Hatsudoki Kabushiki Kaisha, Iwata, Japan

[22] Filed: Mar. 20, 1975

[21] Appl. No.: 560,519

[30] Foreign Application Priority Data

Mar. 25, 1974 Japan .................. 49-33851[U]

[52] U.S. Cl. .................. 74/604; 123/192 B
[51] Int. Cl.² .................. F16F 15/26; F16F 15/28
[58] Field of Search .......... 74/604, 603; 123/192 B

[56] References Cited

UNITED STATES PATENTS

| | | | |
|---|---|---|---|
| 2,914,963 | 12/1959 | Scherenberg | 74/604 |
| 2,914,964 | 12/1959 | Bensinger et al. | 74/604 |
| 3,744,342 | 7/1973 | Kinoshita | 74/604 |

*Primary Examiner*—Samuel Scott
*Assistant Examiner*—F. D. Shoemaker

[57] ABSTRACT

Piston-crank mechanism for internal combustion engines, which comprises a piston, a crank-shaft having a crank-pin, a connecting rod for connecting the piston with said crank pin, an externally toothed gear disposed in side-by-side relationship with respect to the connecting rod and supported for rotation on a pin member extending axially from the crank pin, an internally toothed stationary gear having a member of teeth twice that of the external gear and meshing with the external gear, a pair of rotating balance weights provided on the external gear at the opposite sides thereof in such a manner that they will be in the lower position when the crank pin is in the top dead center, and revolving balance weight means provided on the crank shaft on the side opposite to the crank pin.

7 Claims, 3 Drawing Figures

PISTON-CRANK MECHANISM FOR INTERNAL COMBUSTION ENGINES

The present invention relates to a piston-crank mechanism for a reciprocating piston type internal combustion engine, and more particularly to such a piston-crank mechanism in which primary inertia force can be perfectly balanced.

In a reciprocating piston type engine, there has already been proposed by, for example, the U.S. Pat. No. 3,744,342 to provide a piston-crank mechanism comprising a crank shaft having crank webs and a crank pin, an externally toothed gear mounted for rotation on a pin which is extending from the crank pin, an internally toothed stationary gear which has a number of teeth twice that of said external gear, revolving balance weight means provided on said crank webs on the side opposite to the crank pin, and a rotating balance weight provided on the external gear in such a way that it will be in its lower position when the crank pin is in the top dead center whereby the primary inertia force caused by reciprocating motion of the piston can almost completely be balanced. The patent discloses as specific embodiments such arrangements that include a rotating balance weight which is disposed at one side, that is, the side of the external gear adjacent to the large diameter end of the piston connecting rod. The arrangements provide satisfactory results as far as the engine is operated at a relatively low speed or period of high engine operation is relatively short. However, when the mechanism is applied to such a machine that is operated at a high speed for a prolonged time, such as a chain-saw, bearing means for rotatably supporting the external gear is subjected to a twisting load of substantial value so that the life of the bearing means is remarkably shortened.

Therefore, the present invention has an object to eliminate the aforementioned disadvantages of the known piston-crank mechanism.

Another object of the present invention is to provide a piston-crank mechanism of an internal combustion engine in which the primary inertia force caused by reciprocating motion of the piston and which is substantially free from any load which may have adverse effect on the life of bearing means.

According to the present invention, the above and other objects can be achieved by a piston-crank mechanism for an internal combustion engine, which comprises a piston, a crankshaft having a crank pin, a connecting rod for connecting the piston with said crank pin, an externally toothed gear disposed in side-by-side relationship with respect to the connecting rod and supported for rotation on a pin member extending axially from the crank pin, an internally toothed stationary gear having a number of teeth twice that of the external gear and meshing with the external gear, a pair of rotating balance weights provided on the external gear at the opposite sides thereof in such a manner that they will be in the lower position when the crank-pin is in the top dead center, and revolving balance weight means provided on the crank shaft on the side opposite to the crank pin. since the rotating balance weights are disposed at the opposite sides of the external gear, bearing means for supporting the external gear can be free from any twisting moment in the plane including the axis of the external gear.

The above and other objects and features of the present invention will become apparent from the following descriptions of preferred embodiments of the invention taking reference to the accompanying drawings, in which.

Figure 1:
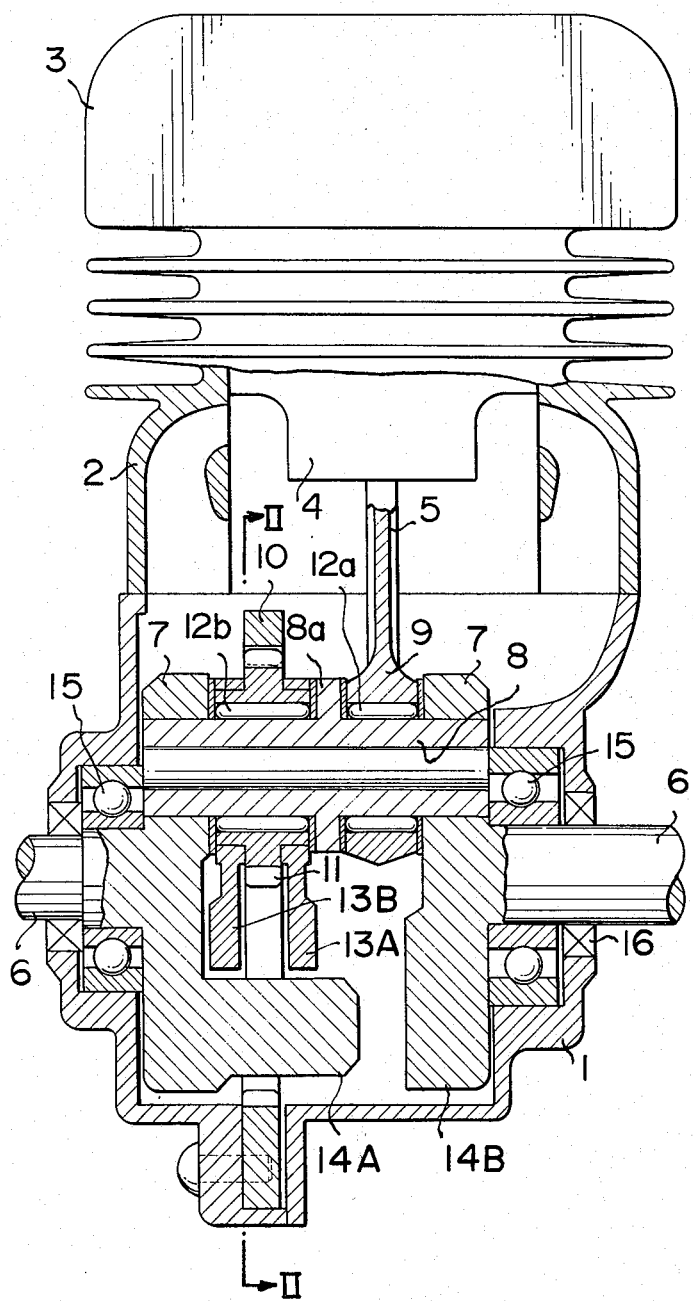
FIG. 1 is a vertical sectional view of an internal combustion engine having a piston-crank mechanism in accordance with one embodiment of the present invention.
Figure 2:
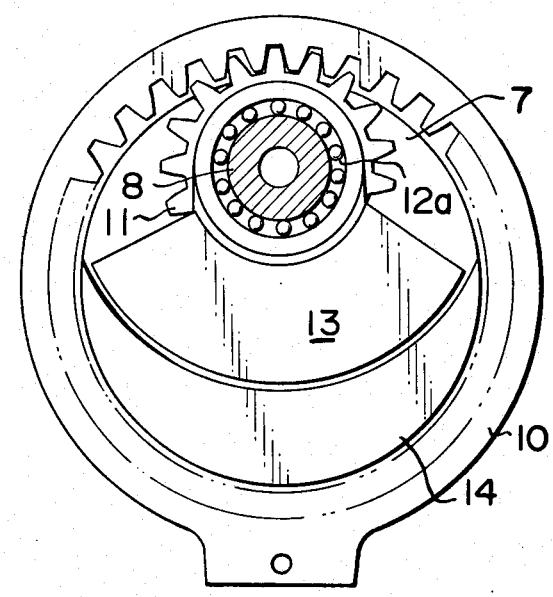
FIG. 2 is a sectional view taken substantially along the line II—II in FIG. 1.

Referring now to the drawings, particularly to FIGS. 1 and 2, there is shown an internal combustion engine including a crank-case 1, a cylinder 2 and a cylinder head 3. A piston 4 is disposed in the cylinder 2 for reciprocating motion. A crank-shaft 6 having crank arms 7 and a crank pin 8 is supported for rotation in the crank-case 1 by bearings 15. A connecting rod 5 has a large diameter end 9 rotatably connected with the crank-pin 8 through a bearing 12A and a small diameter end (not shown) connected to the piston 4. In FIG. 1, it will be noted that the large diameter end 9 of the connecting rod 5 is axially constrained by a diametrically extending flange 8a and one of the crank-webs 7. Between the flange 8A and the other of the crank-webs 7, there is disposed an externally toothed gear 11. The gear 11 is supported for rotation by a bearing 12B and meshing with an internally toothed gear 10 which is secured to the crank-case 1. The gear 10 has a number of teeth which is twice that of the gear 11. The gear 11 carries a pair of rotating balance weights 13A and 13B which are mounted thereon at the opposite sides thereof in such a manner that they are in the lower position when the crank-pin 8 is in the top dead center. In the drawing, it will be noted that the balance weight 13A and 13B are disposed radially outwardly of the circle of the gear 11. The balance weights 13A and 13B may have the same configuration and the same mass. This will provide an advantage in that the mass of the rotating balance weights can be reduced and the pin length of the crank pin 8 can be shortened. The crank-webs 7 are provided with revolving balance weights 14A and 14B on the side opposite to the crank-pin 8. The crank-case 1 is provided with oil seals 16 disposed around the crank-shaft 6.

In the piston-crank mechanism described above, it will be understood that, as the piston 4 reciprocates in the cylinder 2, the external gear 11 revolves about the axis of the crank shaft 6 simultaneously rotating about its own axis in the direction opposite to the direction of rotation of the crank shaft 6. Representing the reciprocating mass on the crank-pin 8 by $m_A$, the total mass of the rotating balance weights by $m_B$, the mass of the revolving balance weights by $m_C$, the mass of rotating parts by $m_D$, the arm length of the rotating balance weights by $R_B$, the arm length of the revolving balance weights by $R_C$, the distance between the rotating axis of the crank shaft and that of the crank pin by $l$, a perfect balance of the primary inertia force can be obtained by establishing the following relationship.

$$m_B \cdot R_B = (l/2) m_A$$

$$m_C \cdot R_C = m_B l + (l/2) m_A + m_D l$$

Figure 3:
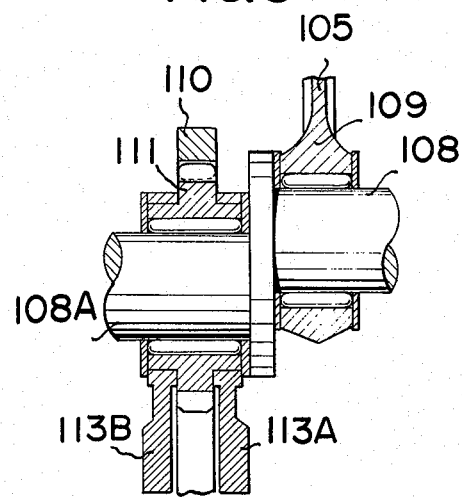
FIG. 3 is a fragmentary sectional view showing another embodiment of the present invention.

FIG. 3 shows another embodiment of the present invention. In this embodiment, the external gear 111 is supported on a pin portion 108A which is offset from the axis of the crank-pin 108 toward the axis of the crank-shaft. As in the previous embodiment, the connecting rod 105 is supported at its large diameter end 109 on the crank-pin 108, and a pair of rotating balance weights 113A and 113B are mounted on the gear 111 at its opposite sides. The gear 111 is meshing with an internally toothed stationary gear 110. In this arrangement, the following relationship should be established.

$$m_B \cdot R_B = (l/2) m_A$$

$$m_C \cdot R_C = m_B(l - e) + (l/2) m_A + m_D \cdot l$$

where $e$ is the distance between the axis of the external gear and that of the crank pin.

The arrangement is advantageous in that the internally toothed gear can be of small diameter so that the dimension of the crankcase can be totally reduced.

The invention has thus been shown and described with reference to specific embodiments, however, it should be noted that the invention is in no way limited to the details of the illustrated embodiments but changes and modifications may be made without departing from the scope of the appended claims.

I claim:

1. A piston-crank mechanism for an internal combustion engine, which comprises a piston, a crankshaft having a crank pin, a connecting rod for connecting the piston with said crank pin, an externally toothed gear disposed in side-by-side relationship with respect to the connecting rod and supported for rotation on a pin member extending axially from the crank pin, an internally toothed stationary gear having a number of teeth twice that of the external gear and meshing with the external gear, a pair of rotating balance weights provided on the external gear at the opposite sides thereof in such a manner that they will be in the lower position when the crank pin is in the top dead center, each of said rotating balance weights having substantially the same configuration and mass so that the center of gravity of said weights will lie in the plane of the external gear and thus prevent twisting moment about the support for the external gear, and revolving balance weight means provided on the crank shaft on the side opposite to the crank pin.

2. A piston-crank mechanism in accordance with claim 1 in which said rotating balance weights are disposed substantially radially outwardly of the circle of said external gear.

3. A piston-crank mechanism in accordance with claim 1 in which said pin member for supporting the external gear is co-axial to the crank pin.

4. A piston-crank mechanism in accordance with claim 1 in which said pin member for supporting the external gear is offset from the axis of the crank pin toward the axis of rotation of the crank shaft.

5. A piston-crank mechanism in accordance with claim 1 wherein $$m_B \cdot R_B = (l/2) m_A$$

$$m_C \cdot R_C = m_B(l - e) + (l/2) m_A + m_D \cdot l$$

wherein;

$m_A$ = reciprocating mass on the crank pin
$m_B$ = total mass of the rotating balance weights
$m_C$ = mass of the revolving balance weights
$m_D$ = mass of rotating parts
$R_B$ = arm length of the rotating balance weights
$R_C$ = arm length of the revolving balance weights
$l$ = distance between the rotating axis of the crank shaft and that of the crank pin
$e$ = distance between the rotating axis of the external gear and that of the crank pin 6. A piston-crank mechanism in accordance with claim 3 in which said pin member is integral with said crank pin and a flange is provided between the crank pin and the pin member so as to axially constrain the external gear.

7. A reciprocating piston type internal combustion engine according to claim 1, wherein $$m_B \cdot R_B = (l/2) m_A$$

$$m_C \cdot R_C = m_B \cdot l + (l/2) m_A + m_D \cdot l$$

wherein;

$m_A$ = the reciprocating mass added to the piston-pin
$m_B$ = the mass of the rotating balance weight
$m_C$ = the mass of the revolving balance weight
$m_D$ = the rotating mass added to the crank pin
$l$ = the distance between the center line of the crankpin and the center line of the crank journals
$R_B$ = the distance between the center of gravity of $m_B$ and the center line of the crank-pin
$R_C$ = the distance between the center of gravity of $m_C$ and the center line of the crank journals.

* * * * *